(12) United States Patent
Lee et al.

(10) Patent No.: US 9,065,615 B2
(45) Date of Patent: Jun. 23, 2015

(54) PREAMBLE TRANSMISSION AND RECEPTION METHOD AND APPARATUS FOR OFDM SYSTEM

(75) Inventors: Hak Ju Lee, Incheon (KR); Se Ho Myung, Suwon-si (KR); Jae Yoel Kim, Suwon-si (KR); Yeon Ju Lim, Seoul (KR); Sung Ryul Yun, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 810 days.

(21) Appl. No.: 12/582,266

(22) Filed: Oct. 20, 2009

(65) Prior Publication Data

US 2010/0135422 A1    Jun. 3, 2010

(30) Foreign Application Priority Data

Oct. 20, 2008  (KR) .................. 10-2008-0102501

(51) Int. Cl.
   *H04J 11/00* (2006.01)
   *H04L 27/00* (2006.01)
   (Continued)

(52) U.S. Cl.
   CPC ............ *H04L 5/0053* (2013.01); *H04L 1/0072* (2013.01); *H04L 1/0079* (2013.01); *H04L 5/0007* (2013.01); *H04L 27/2692* (2013.01); *H04L 27/2602* (2013.01)

(58) Field of Classification Search
   CPC ............ H04J 2011/0009; H04J 13/004; H04J 13/107; H04L 1/0072; H04L 1/0079; H04L 5/0007; H04L 5/0053; H04L 27/2602; H04L 27/2607; H04L 27/2643; H04L 27/2675; H04L 27/2692; H04L 27/28; H03M 13/05; H03M 13/09; H03M 13/15; H03M 13/253; H03M 13/27; H03M 13/2906
   USPC ......... 370/203, 319, 329, 343, 349, 480, 492; 375/260; 455/450, 509; 714/752, 755, 714/776
   See application file for complete search history.

(56) References Cited

U.S. PATENT DOCUMENTS 6,925,070 B2 *   8/2005  Proctor, Jr. .................. 370/335
7,089,478 B2 *   8/2006  Cummings et al. ........... 714/755
(Continued)

FOREIGN PATENT DOCUMENTS

EP    1 392 015      2/2004
JP    10-190634     7/1998
(Continued)

OTHER PUBLICATIONS

Digital Video Broadcasting, "Frame Structure Channel Coding and Modulation for a Second Generation Digital Terrestrial Television Broadcasting System (DVB-T2)," DVB Document A122, Jun. 2008.
(Continued)

*Primary Examiner* — Alpus H Hsu
(74) *Attorney, Agent, or Firm* — The Farrell Law Firm, P.C.

(57) ABSTRACT

A method and apparatus for transmitting and receiving a preamble having sequence information for an OFDM system is provided. The preamble transmission method includes generating a preamble block including at least one frame having a header with a known sequence and a code block containing control information and transmitting the preamble block mapped to Orthogonal Frequency Division Multiplexing (OFDM) cells by repeating in frequency axis direction.

12 Claims, 11 Drawing Sheets

(51) Int. Cl.

| | |
|---|---|
| *H04L 27/28* | (2006.01) |
| *H03M 13/05* | (2006.01) |
| *H03M 13/15* | (2006.01) |
| *H03M 13/27* | (2006.01) |
| *H04L 5/00* | (2006.01) |
| *H04L 1/00* | (2006.01) |
| *H04L 27/26* | (2006.01) |

(56) References Cited

U.S. PATENT DOCUMENTS

| | | | |
|---|---|---|---|
| 7,471,620 B2* | 12/2008 | Alazraki et al. | 370/204 |
| 7,519,123 B1* | 4/2009 | Larsson et al. | 375/260 |
| 7,535,819 B1* | 5/2009 | Larsson et al. | 370/208 |
| 7,631,242 B2* | 12/2009 | Currivan et al. | 714/755 |
| 7,650,560 B2* | 1/2010 | Mo et al. | 714/790 |
| 7,889,702 B2* | 2/2011 | Proctor, Jr. | 370/335 |
| 8,213,484 B2* | 7/2012 | Walton et al. | 375/146 |
| 2002/0159413 A1 | 10/2002 | Tsubouchi et al. | |
| 2003/0002499 A1 | 1/2003 | Cummings et al. | |
| 2005/0084030 A1* | 4/2005 | Zhou et al. | 375/267 |
| 2005/0232139 A1 | 10/2005 | Balakrishnan et al. | |
| 2005/0243940 A1* | 11/2005 | Huh et al. | 375/260 |
| 2006/0023802 A1* | 2/2006 | Balakrishnan et al. | 375/265 |
| 2006/0035654 A1 | 2/2006 | Lee et al. | |
| 2006/0045216 A1 | 3/2006 | Hegyi et al. | |
| 2006/0153282 A1* | 7/2006 | Jung et al. | 375/146 |
| 2006/0182017 A1* | 8/2006 | Hansen et al. | 370/208 |
| 2007/0135125 A1* | 6/2007 | Kim et al. | 455/436 |
| 2008/0039107 A1* | 2/2008 | Ma et al. | 455/450 |
| 2008/0043671 A1 | 2/2008 | Moon et al. | |
| 2008/0043886 A1 | 2/2008 | Inagawa et al. | |
| 2008/0080598 A1* | 4/2008 | Mo et al. | 375/219 |
| 2008/0130770 A1* | 6/2008 | Khandekar et al. | 375/260 |
| 2008/0219211 A1* | 9/2008 | Franceschini et al. | 370/330 |
| 2009/0122987 A1* | 5/2009 | Mo et al. | 380/277 |
| 2009/0285319 A1* | 11/2009 | Zhang et al. | 375/260 |
| 2009/0316568 A1* | 12/2009 | Harris et al. | 370/203 |
| 2010/0002792 A1* | 1/2010 | Seyedi-Esfahani | 375/260 |
| 2010/0040084 A1* | 2/2010 | Seyedi-Esfahani et al. | 370/474 |
| 2011/0094625 A1 | 4/2011 | Yu | |
| 2012/0213255 A1 | 8/2012 | Stadelmeier et al. | |

FOREIGN PATENT DOCUMENTS

| | | |
|---|---|---|
| JP | 2006-074277 | 3/2006 |
| JP | 2009-296586 | 12/2009 |
| JP | 2012-506208 | 3/2012 |

OTHER PUBLICATIONS

DVB Organization: "Preamble Structure for C2," DVB-C2 Joint Contribution, Digital Video Broadcasting, Nov. 12, 2008.
Liam Alfandary et al., CopperGate Communications, "Robust Modulation of Payload (Merged Proposal based on 08NT-025, 08AB-061 and 08AB-023)," Jul. 21-25, 2008.
DVB Organization: "Sony's Response to the DVB-C2 CfT," Digital Video Broadcasting, Jul. 3, 2008.
DVB Organization: "Response to the DVB-C2 Call for Technologies (CfT)," Digital Video Broadcasting, Jun. 16, 2008.
European Search Report dated Nov. 20, 2014 issued in counterpart application No. 09173508.4-1851.
DVB Organization: Response to the Call for Technologies for DVB-T2, Digital Video Broadcasting, CfT_SIDSA_CSS_Estimation, Jun. 4, 2007.
DVB Organization: "Frame Structure, Channel Coding and Modulation for Entire DVB-T2 Baseline System Proposal—Part 1—First Phase of DVB-T2", Digital Video Broadcasting, Jun. 4, 2007.
Korean Office Action dated Feb. 12, 2015 Issued in counterpart application No. 10-2008-0102501.

* cited by examiner

PREAMBLE TRANSMISSION AND RECEPTION METHOD AND APPARATUS FOR OFDM SYSTEM

PRIORITY

This application claims priority to an application entitled "PREAMBLE TRANSMISSION AND RECEPTION METHOD AND APPARATUS FOR OFDM SYSTEM" filed in the Korean Intellectual Property Office on Oct. 20, 2008 and assigned Serial No. 10-2008-0102501, the contents of which are hereby incorporated by reference.

BACKGROUND OF THE INVENTION

1. Field of the Invention

The present invention relates to an Orthogonal Frequency Division Multiplexing (OFDM) system and, in particular, to a method and apparatus for transmitting and receiving a preamble having sequence information for an OFDM system.

2. Description of the Related Art

Orthogonal Frequency Division Multiplexing (OFDM) is a bandwidth efficient digital modulation technique that has been adopted for a variety of advanced broadcast standards such as Digital Video Broadcasting-Terrestrial (DVB-T). Digital Video Broadcasting-Cable 2 (DVB-C2), a new standard for broadcast transmission over cable, has also selected OFDM as its modulation technique to provide a high degree of efficiency and flexibility.

The DVB-C2 system supports the feature of flexible and dynamic bandwidth allocation by combining various adjacent channels to a single wideband channel. In the case of a single channel implementation, the bandwidth of the DVB-C2 becomes 8 MHz, equal to that of the DVB-C. Accordingly, when N channels are combined, the bandwidth of the DVB-C2 system increases N times compared to the DVB-C. This means that the DVB-C2 has the bandwidth of N×8 MHz.

A comparison will now be made between the channel combinations in the DVB-C and the DVB-C2. In the DVB-C system the number of guard bands increases in proportion to the number of channels combined due to the guard bands required to ensure separation between channels. In an exemplary case of a combination of 4 channels, the total bandwidth available for the data transfer is equal to a value obtained by subtracting 5 guard bands from the entire 24 MHz bandwidth (4×8 MHz).

In contrast, the DVB-C2 system transmits signals using the OFDM which does not require guard bands between channels except for the guard bands at the edges. Accordingly, when 4 channels are combined, the total bandwidth available for the data transfer is equal to a value obtained by subtracting 2 guard bands from the entire 24 MHz bandwidth (4×8 MHz). From the comparison, it is obvious that the DVB-C2 system is superior to the DVB-C system in spectral efficiency.

FIG. 1 is a diagram illustrating a frame format of a conventional DVB-C2 system with a fixed tuning window.

In FIG. 1, two channels 101 and 102 occupy two different frequency bands, and each channel is composed of different broadcast data (i.e. PLP1 105 and PLP 2 106 for the first channel 101 and PLP3 107, PLP4 108, and PLP5 109 for second channel 102). The frame starts with preambles 103 and 104 containing control information for the respective channels 101 and 102. In this case, the receiver is tuned to channel 1 101 or channel 2 102 to receive the broadcast data transmitted on the corresponding channel.

In order to improve the resource allocation efficiency, the broadcast data is scheduled over entire channel bandwidth.

FIG. 2 is a diagram illustrating a frame format of another conventional DVB-C2 system. In FIG. 2, the bandwidth of each preamble block is identical to a reception bandwidth of 8 MHz as denoted by reference numeral 220. It is noted that the broadcast data 213 is allocated regardless of a boundary of the channels. In this case, the same control information is transmitted within the two preambles 202 and 203. The receiver can align its tuning window 220 to receive the target broadcast data without a need to be aligned with the preambles. Here, the maximum frequency bandwidth of each broadcast data cannot be greater than the minimum reception bandwidth of the receiver (in FIG. 2, 8 MHz).

It can be considered that a preamble block is allocated a bandwidth narrower than the reception bandwidth of the receiver unlike the exemplary case of FIG. 2 in which the bandwidth of each preamble block is identical to the reception bandwidth of the receiver. In this case, the preamble can be received within the reception bandwidth (8 MHz) without being segmented.

FIG. 3 is a diagram illustrating a frame format of another conventional DVB-C2 system. In FIG. 3, the bandwidth of a preamble block is narrower than the reception bandwidth of the receiver. When the bandwidth of a preamble is narrower than the reception bandwidth of the receiver, the receiver can receive a non-segmented preamble block 302 within its reception bandwidth. In this case, however, a specific preamble block 303 is received due to the tuning to the bandwidth of the channel carrying the preamble block 302. This is because the frequency band outside the frequency band 303 is another system bandwidth, e.g. a frequency bandwidth allocated for a communication system other than the DVB-C2.

FIG. 4 is a diagram illustrating a principle of operation of the receiver in the conventional DVB-C2 system when segmented preambles are received in the reception bandwidth. When the reception bandwidth as denoted by reference numeral 420 is aligned to receive the broadcast data (PLP2) as shown in FIG. 4, the preamble information as denoted by reference numeral 401 is received within the reception bandwidth. In this case, since the preamble information is received within two preamble blocks 410 and 411, the information carried by the preamble blocks 410 and 411 must be reordered to obtain the complete information as denoted by reference numeral 430.

Accordingly, in order to obtain the complete control information in the above described conventional DVB-C2 system, the receiver must estimate a boundary frequency 425 and reorder information carried by the preambles based on the boundary frequency 425, thereby processing latency. Particularly, when the boundary frequency is misestimated due to the frequency offset, the receiver is likely to fail to obtain complete control information from the preamble, resulting in reception failure of the data within the entire frame.

SUMMARY OF THE INVENTION

In order to overcome at least the problems of the prior art, the present invention provides a method and apparatus for transmitting and receiving a preamble robust to frequency offset in an OFDM-based broadcast system.

The present invention provides a method and apparatus for transmitting and receiving a preamble in an OFDM-based broadcast system that is capable of removing unnecessary dummy cells in a preamble block and improving reception performance by repeating control information.

The present invention provides a method and apparatus for transmitting and receiving a preamble in an OFDM-based broadcast system that is capable of improving reception performance of a receiver by negating the reordering process cause by reception of segmented preambles.

In accordance with an embodiment of the present invention, a preamble transmission method includes generating a preamble block including at least one frame having a header with a known sequence and a code block containing control information; and transmitting the preamble block mapped to Orthogonal Frequency Division Multiplexing (OFDM) cells by repeating in the frequency axis direction.

In accordance with another embodiment of the present invention, a preamble reception method includes detecting a sequence from a signal received through a reception bandwidth; calculating a start position and a length of a code block using the detected sequence; extracting control information from the code block based on the start position and length of the code block; and decoding received data signal based on the control information.

In accordance with another embodiment of the present invention, a preamble transmitter includes an encoder which encodes control information into a code block; a sequence generator which generates a sequence and inserts the sequence into a header of the code block; and a symbol mapper which maps a frame having the header and the code block to Orthogonal Frequency Division Multiplexing (OFDM) cells of a preamble block, repeats the frame in the frequency axis direction, and transmits the repeated frames.

In accordance with still another embodiment of the present invention, a preamble receiver includes a sequence detector which detects a sequence from a signal received through a reception bandwidth and calculates a start position and a length of a code block using the detected sequence; a control information extractor which extracts control information from the code block base on the start position and length of the code block; and a data extractor which decodes received data signal based on the control information.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EXEMPLARY EMBODIMENTS

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

A structure of a frame used in the preamble transmission method and apparatus according to an embodiment of the present invention is described first.

Figure 1:
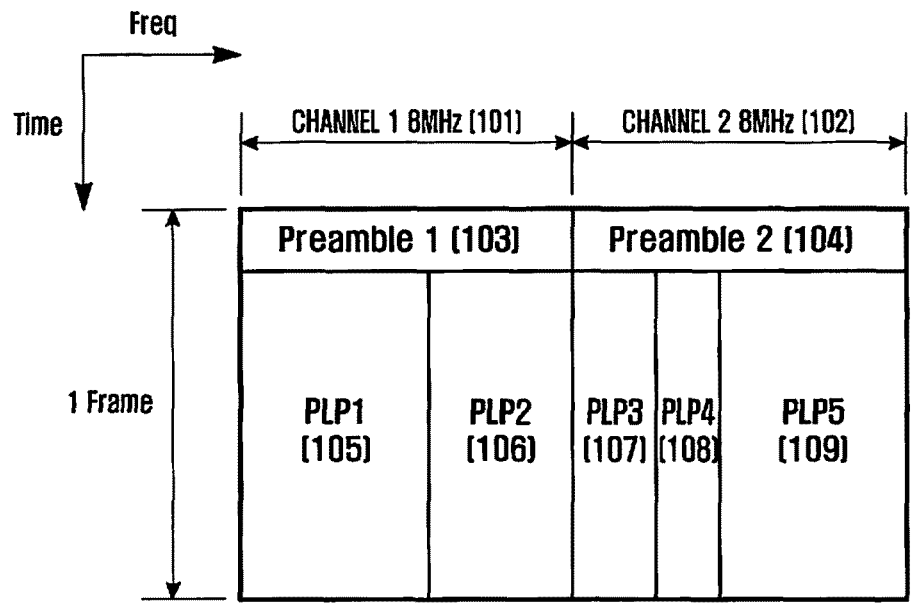
FIG. 1 is a diagram illustrating a frame format of a conventional DVB-C2 system with a fixed tuning window.
Figure 2:
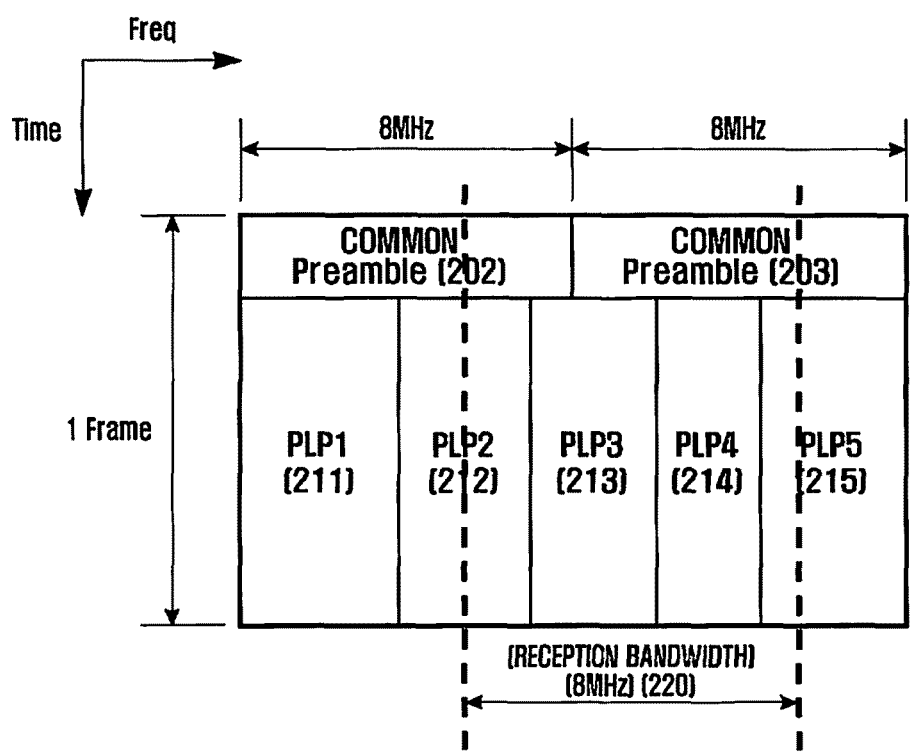
FIG. 2 is a diagram illustrating a frame format of another conventional DVB-C2 system.
Figure 3:
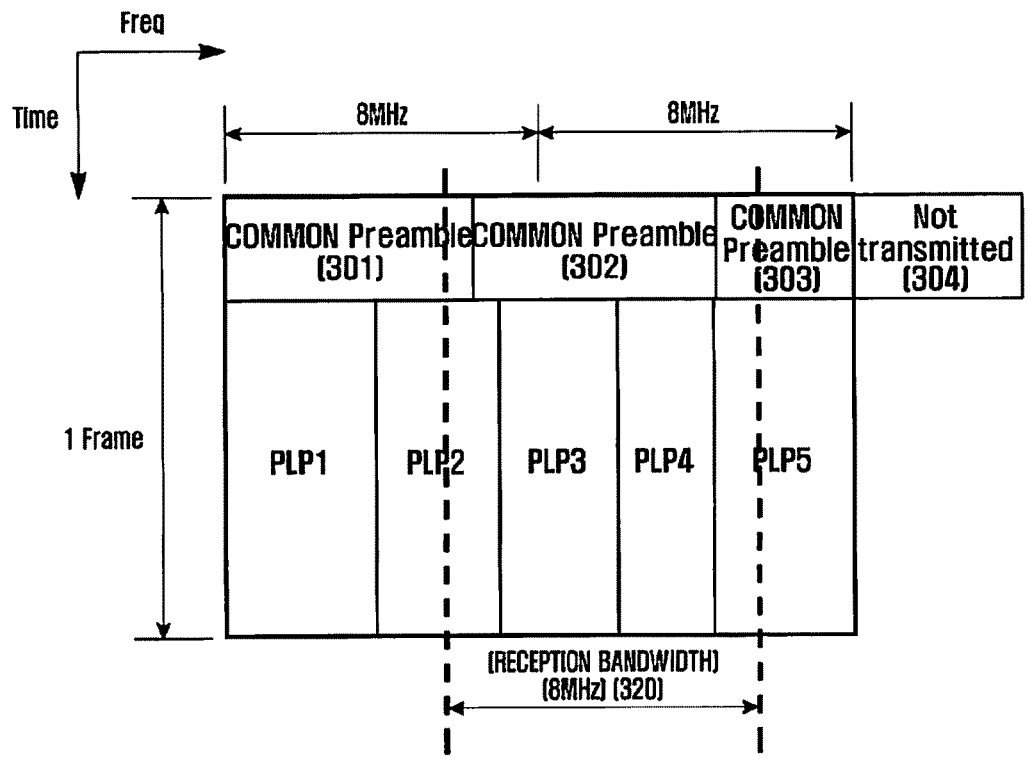
FIG. 3 is a diagram illustrating a frame format of another conventional DVB-C2 system.
Figure 4:
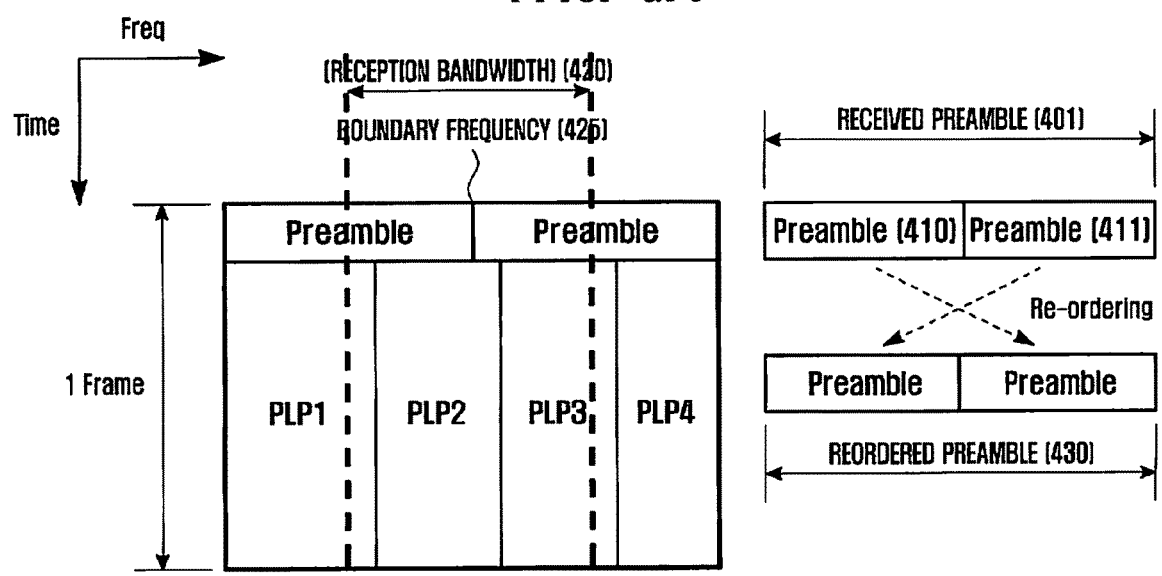
FIG. 4 is a diagram illustrating a principle of operation of the receiver in the conventional DVB-C2 system when segmented preambles are received in the reception bandwidth.
Figure 5:
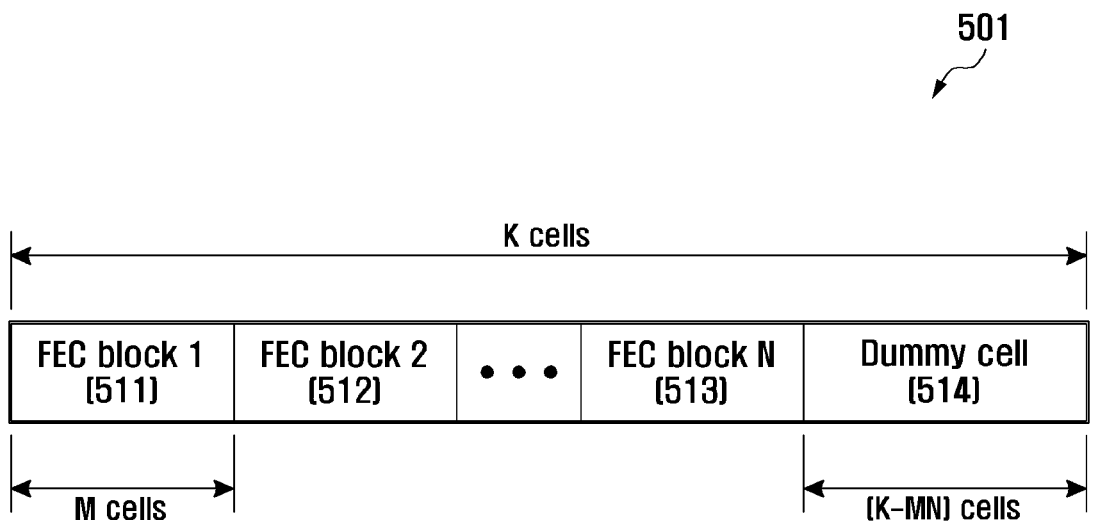
FIG. 5 is a diagram illustrating a structure of a preamble block used in the conventional DVB-C2 system.
Figure 6:
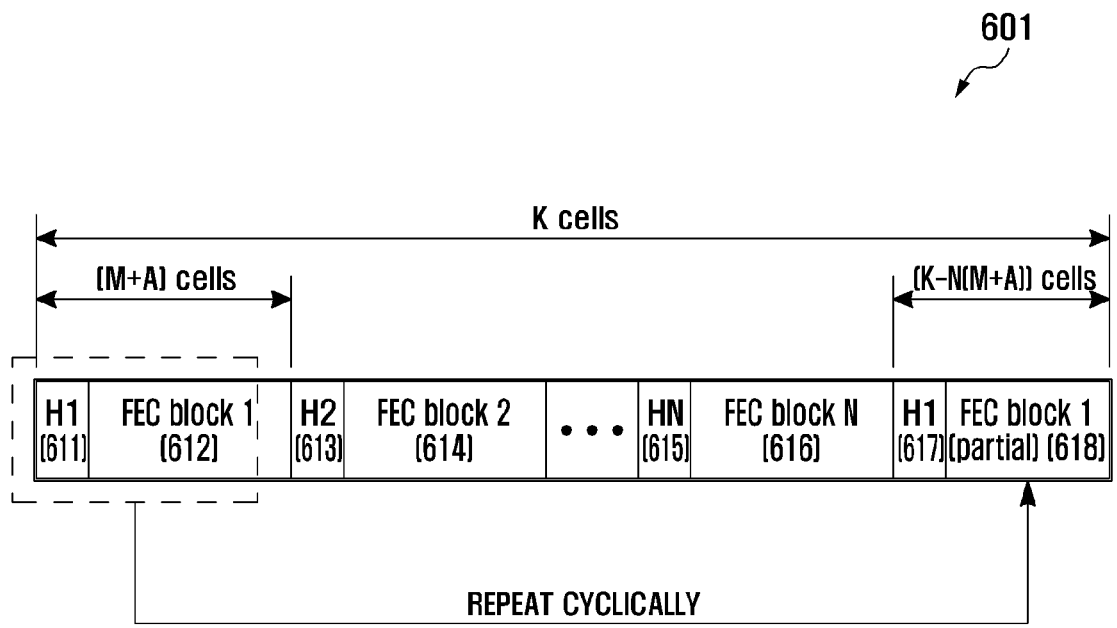
FIG. 6 is a diagram illustrating a format of a preamble block for used in a preamble transmission and reception method according to an embodiment of the present invention.

FIG. 5 is a diagram illustrating a structure of a preamble block used in the conventional DVB-C2 system, and FIG. 6 is a diagram illustrating a format of a preamble block for used in a preamble transmission and reception method according to an embodiment of the present invention.

As shown in FIG. 5, a preamble block 501 of the conventional C2 frame is composed of K OFDM cells and has a bandwidth less than or equal to a reception bandwidth of a receiver.

The control information for a frame is encoded and modulated into one or more Forward Error Correction (FEC) blocks 511 to 513 and then inserted into a beginning part of the preamble block. In FIG. 5, it is assumed that an FEC block consists of M cells and the control information is carried by N FEC blocks. Accordingly, K−M×N cells are empty in the preamble block 501. The length of the preamble block 501 has a fixed value determined previously, such that the empty part of the preamble block is filled with dummy cells. The number of dummy cells is variable according to the length of the control information and thus, when the length of the control information is short, the preamble block is mostly filled with dummy cells, resulting in a waste of resources.

A preamble block according to an embodiment of the present invention is depicted in FIG. 6 under the assumption in that the preamble block is composed of K cells, a preamble header is composed of A cells, a FEC block includes M cells, and the control information is carried by N FEC blocks. In this case, the preamble headers 611, 613, and 615 are inserted in front of the corresponding FEC blocks 612, 614, and 616. Here, the control information is information relevant to all of the channels. That is, the first to $N^{th}$ code blocks carry the data on all of the channels.

In an embodiment of the present invention, a preamble header 611 (or 613 or 615) has a known sequence value. The sequence can be a Pseudo Noise sequence. Additionally, each preamble header can include an index of the FEC block and a length of the FEC block. In FIG. 6, the length of the header is predetermined with A cells, K−N*(M+a) cells are empty in the preamble block. In an embodiment of the present invention, the empty part of the preamble block is filled with the region copied from the beginning of the preamble block as much as the length of the empty part unlike the conventional preamble block in which the empty part is filled with the dummy cells. Accordingly, the empty part of the preamble block is filled with the preamble header 617 identical to the preamble header 611 and the partial FEC block 618 identically to the beginning part of the FEC block 612.

The partial FEC block 618 can be combined with the FEC block 612 at the receiver by means of a Maximal Ratio Combining method for improving the reception performance.

Figure 7:
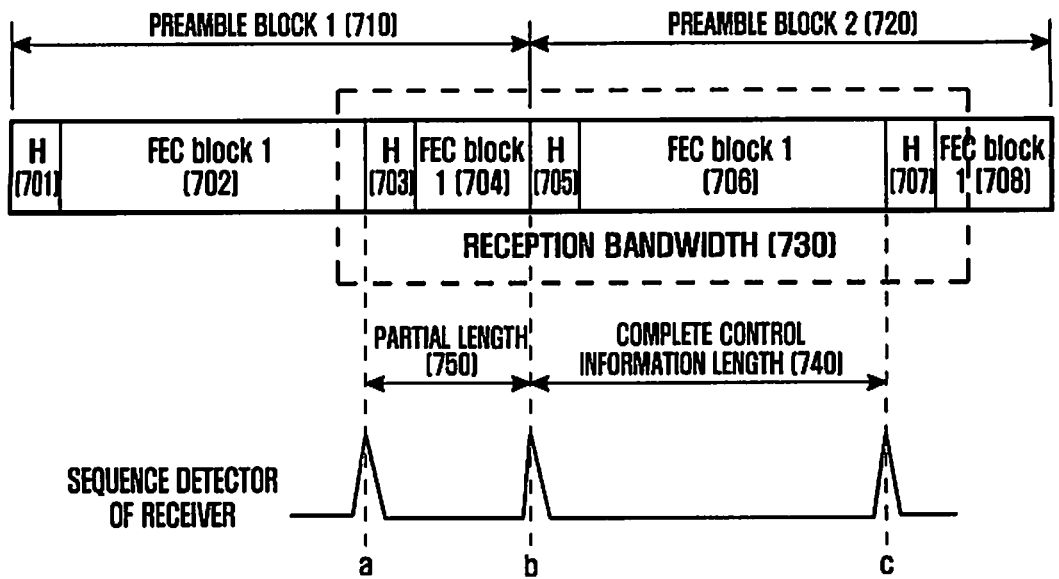
FIG. 7 is a diagram illustrating a principle of a preamble transmission and reception method according to an embodiment of the present invention.
Figure 8:
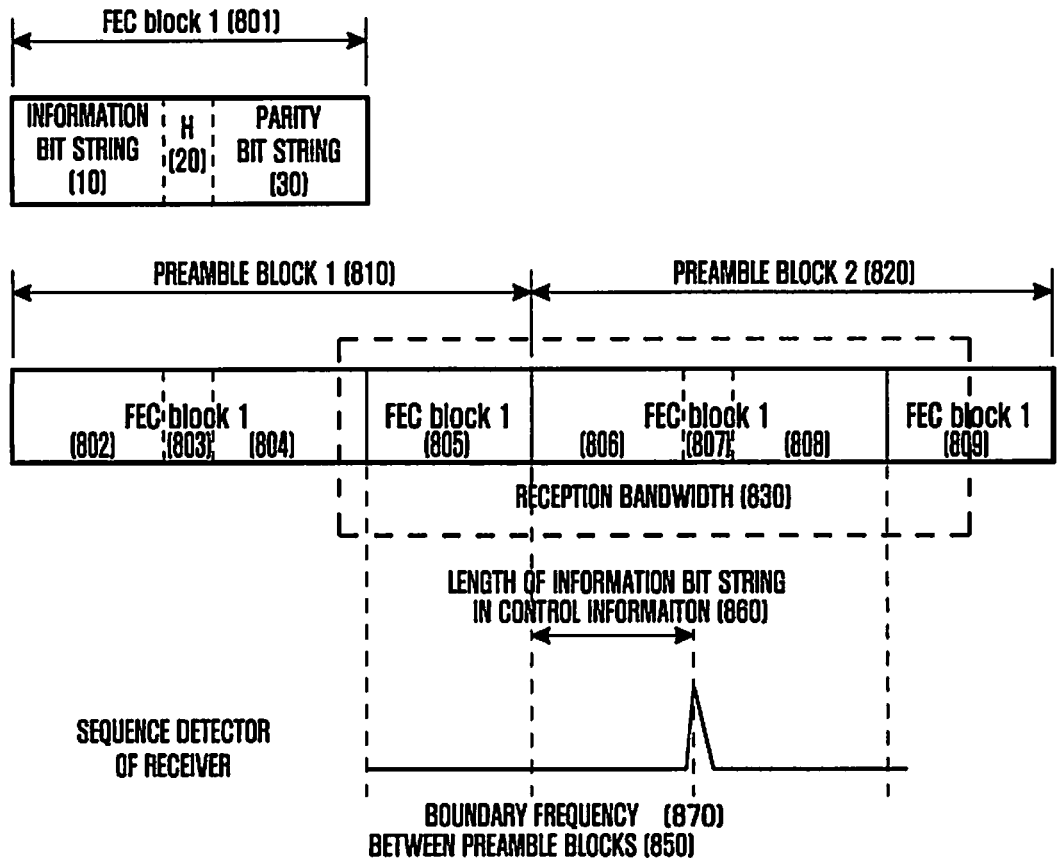
FIG. 8 is a diagram illustrating a principle of a preamble transmission and reception method according to another embodiment of the present invention.

How to insert the sequence into the preamble headers at the transmitter and how to recover the control information from the preamble headers at the receiver are described hereinafter. FIGS. 7 and 8 are diagrams illustrating principles of preamble transmission and reception methods according to embodiments of the present invention.

In FIGS. 7 and 8, it is assumed that all of the control information is transmitted within a single FEC block which is repeated in the frequency direction.

In the embodiment of FIG. 7, the known sequence is inserted in front of the FEC block. Referring to FIG. 7, an FEC frame including a header is cyclically repeated until the complete preamble block is filled, such that the preamble block 710 includes the header 701, the first FEC block 702, a repeated header 703, and a repeated FEC block 704. After placing the header 701 and the FEC block 702, the FEC frame is copied from its starting point to fill the remaining empty part of the preamble block 710.

The second preamble block 720 is identical to the first preamble block 710 in structure and data. That is, the second preamble block 720 is a duplicate of the first preamble block 710.

When the tuning window (reception bandwidth) of the receiver is aligned as denoted by reference numeral 730, three headers 703, 705 and 707 are received within the tuning window, each header having a sequence. Accordingly, a sequence detector of the receiver can obtain peak values a, b, and c of the three headers 703, 705, and 707 using a correlation method. That is, the receiver performs correlation operation with the known sequences to obtain the peak values through auto-correlation.

The receiver can estimate the length of the control information based on the interval between the peak values and determines a start point "b" and length of the complete control information 740. Also, the receiver can recognize the partial control information 750, such that the data reliability can be improved by combining the complete control information 740 and the partial control information 750.

Unlike the conventional preamble reception method in which the control information is recovered by finding the boundary frequency between the preamble blocks, i.e. the start point of the header 705, within the tuning window and reordering the control information based on the boundary frequency, the preamble reception method according to the present invention enables the receiver to recovery the complete control information using a simple sequence detector. Accordingly, even when a frequency offset occurs unexpectedly, it is possible to acquire the complete control information with reliable preamble block detection.

Although the known sequence is put in front of the FEC block in the above description, the position of the known sequence can be changed. In another embodiment of the present invention, the known sequence is put in the middle of an FEC block.

In the embodiment of FIG. 8, it is assumed that a systematic code such as Low Density Parity Check (LDPC) code is used for encoding the control information. The systematic code means that the FEC block consists of the input control information bit string and a parity bits string. In this case, the known sequence can be inserted between the information bits string and the parity bits string so as to detect the length of the control information.

Referring to FIG. 8, an FEC block 801 is composed of an information bit string 10, a header 20 having the known sequence, and a parity bit string 30 in series. The FEC block 801 is repeated until a complete preamble block is filled. Here, the first preamble block 810 and the second preamble block 820 are identical to each other and have the known sequences 803 and 807 respectively.

If the receiver is configured with the tuning window (reception band), as denoted by reference numeral 830, equal to or greater than the size of a preamble block, at least one header is received within the tuning window. Accordingly, the receiver can detect a peak value 870 by means of a sequence detector.

Once the peak value 870 is detected, the receiver can calculate the position of the boundary frequency 850 between the first and second preamble blocks 810 and 820 base on position of the peak value 870 and then the information bit string length 860 using the positions of the peak value 870 and the boundary frequency 850. In order to calculate the length of the information bit string in this manner, the receiver should have the tuning information.

A structure of a conventional transmitter and a transmitter for transmitting the preamble block generated with the control information having the known sequence will now be compared.

Figure 9:
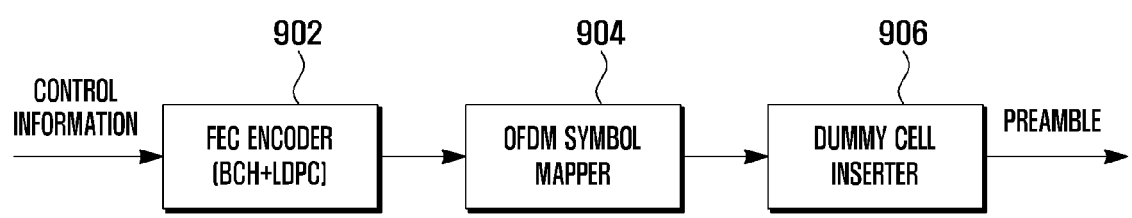
FIG. 9 is a block diagram illustrating a configuration of the conventional transmitter.

FIG. 9 is a block diagram illustrating a configuration of the conventional transmitter. Referring to FIG. 9, the conventional transmitter includes a FEC encoder 902, a symbol mapper 904, and a dummy cell inserter 906.

The FEC encoder 902 encodes and modulates the input control information and outputs the FEC blocks. The symbol mapper 904 maps the FEC blocks to a required number of OFDM cells regardless of the length of the preamble and outputs the OFDM cells. The dummy cell inserter 906 inserts dummy cells into the remaining capacity of a preamble block and outputs a preamble block having a predetermined length. The preamble block formed in this manner is repeated for all the channels.

In an embodiment of the present invention, the transmitter does not insert dummy cells into the remaining capacity of the preamble block. The structure of the transmitter according to an embodiment of the present invention is described hereinafter.

Figure 10:
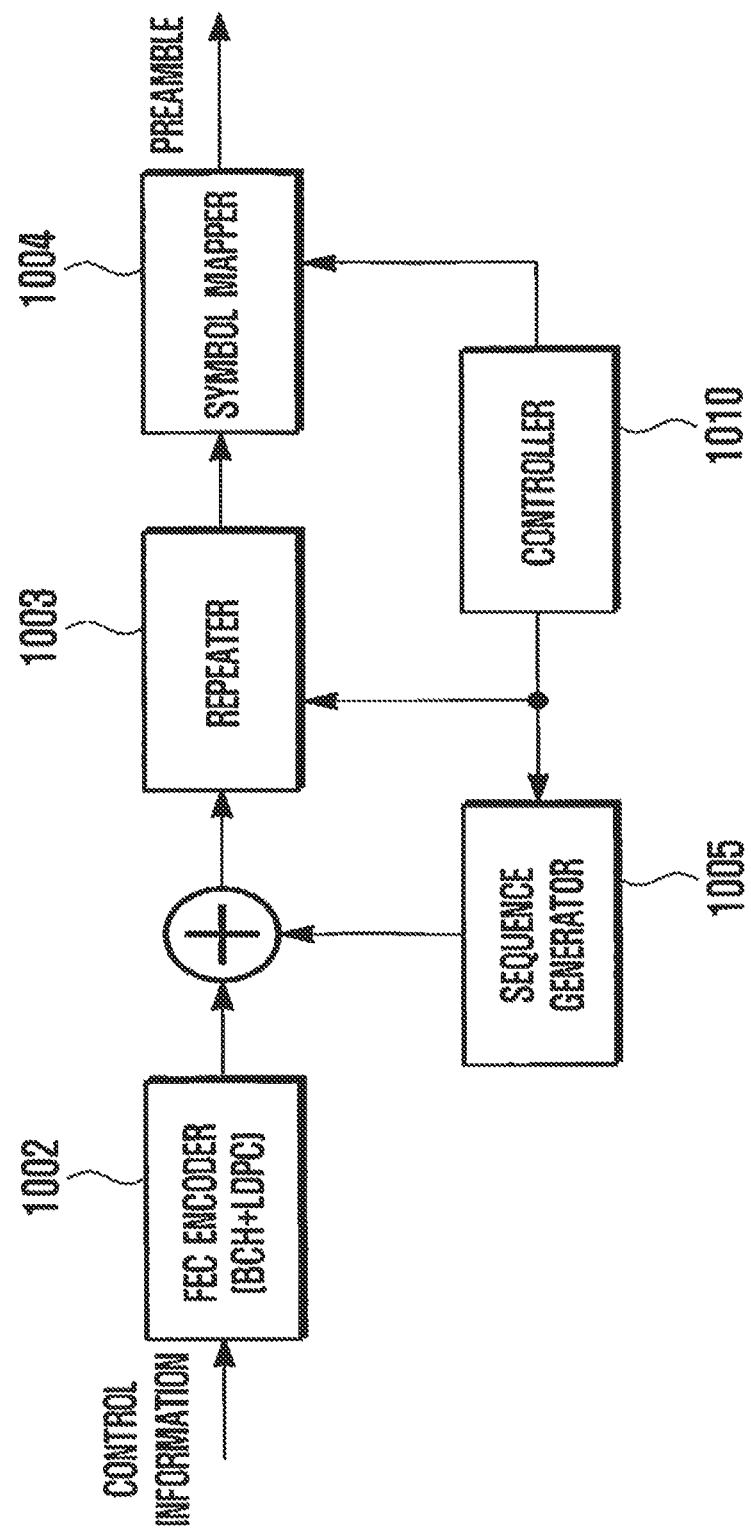
FIG. 10 is a block diagram illustrating a configuration of a transmitter according to an embodiment of the present invention.

FIG. 10 is a block diagram illustrating a configuration of a transmitter according to an embodiment of the present invention. The transmitter depicted in FIG. 10 is configured to insert the known sequence in front of the FEC block as described with reference to FIG. 7.

Referring to FIG. 10, the transmitter according to an embodiment of the present invention includes an FEC encoder 1002, a sequence generator 1005, a repeater 1003, a symbol mapper 1004, and a controller 1010.

The FEC encoder 1002 encodes and modulates the input control information. The sequence generator 1005 generates and outputs a header having the known sequence. The header output by the sequence generator 1005 is added in front of the FEC block output by the FEC encoder 1002 such that an FEC frame is input to the repeater 1003.

The repeater 1003 repeats the FEC frame cyclically until a complete preamble block is filled. As described with reference to FIG. 6, the FEC frame can be broken to fit into the remaining part of the preamble block.

Next, the symbol mapper 1004 maps the FEC blocks to the OFDM cells so as to output a preamble block. In this case, there is no empty space within the preamble block, such that the dummy cell insertion process is negated.

The control unit 1010 outputs a seed value to the sequence generator 1005 in order for the sequence generator 1005 to generate sequences for identifying the FEC blocks and informs the repeater 1003 of a number of cells for filling the preamble block.

Figure 11:
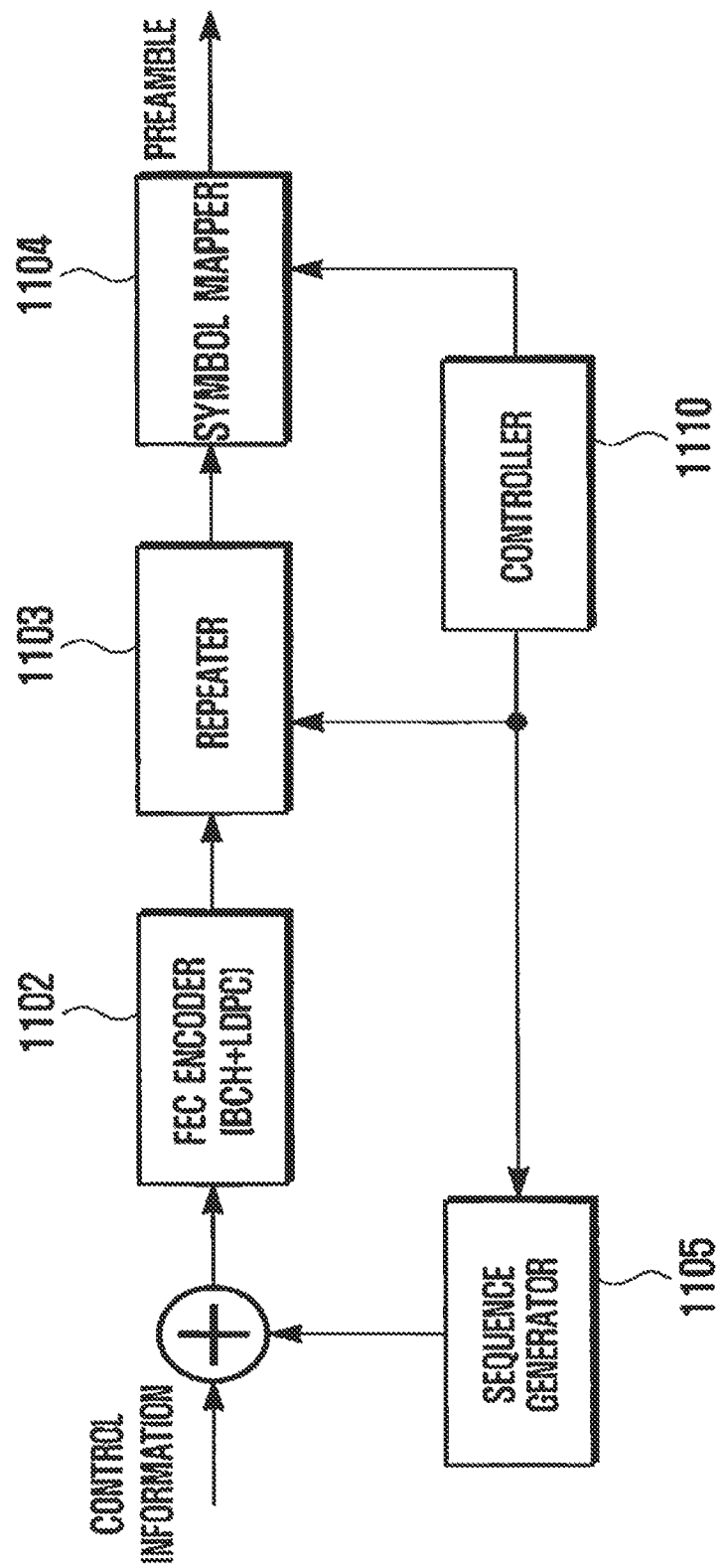
FIG. 11 is a block diagram illustrating a configuration of a transmitter according to another embodiment of the present invention.

FIG. 11 is a block diagram illustrating a configuration of a transmitter according to another embodiment of the present invention. The transmitter depicted in FIG. 11 is configured to insert the know sequence in the middle of the FEC block as described with reference to FIG. 8.

Referring to FIG. 11, the transmitter according to another embodiment of the present invention includes an FEC encoder 1102, a sequence generator 1105, a repeater 1103, a symbol mapper 1104, and a controller 1110.

The sequence generator 1105 generates the known sequence and outputs a header in which the known sequence is inserted. The FEC encoder 1102 inserts the header output by the sequence generator 1105 into the input control information bit string and encodes and modulates the header-inserted bit string to output an FEC block.

Accordingly, the header is inserted in the middle of the FEC block, and the FEC block is input to the repeater 1103. The repeater 1103 repeats the FEC block cyclically until a complete preamble block is filled.

Next, the symbol mapper 1104 maps the FEC blocks to the OFDM cells so as to output a preamble block. In this case, there is no empty space within the preamble block, such that the dummy cell insertion process is negated.

The control unit 1110 outputs a seed value to the sequence generator 1105 in order for the sequence generator 1105 to generate sequences for identifying the FEC blocks and informs the repeater 1103 of a number of cells for filling the preamble block.

The structures of the transmitters according to embodiments of the present invention have been described hereinabove. The preamble block generation methods according to an embodiment of the present invention are described hereinafter with reference to FIGS. 12 and 13.

Figure 12:
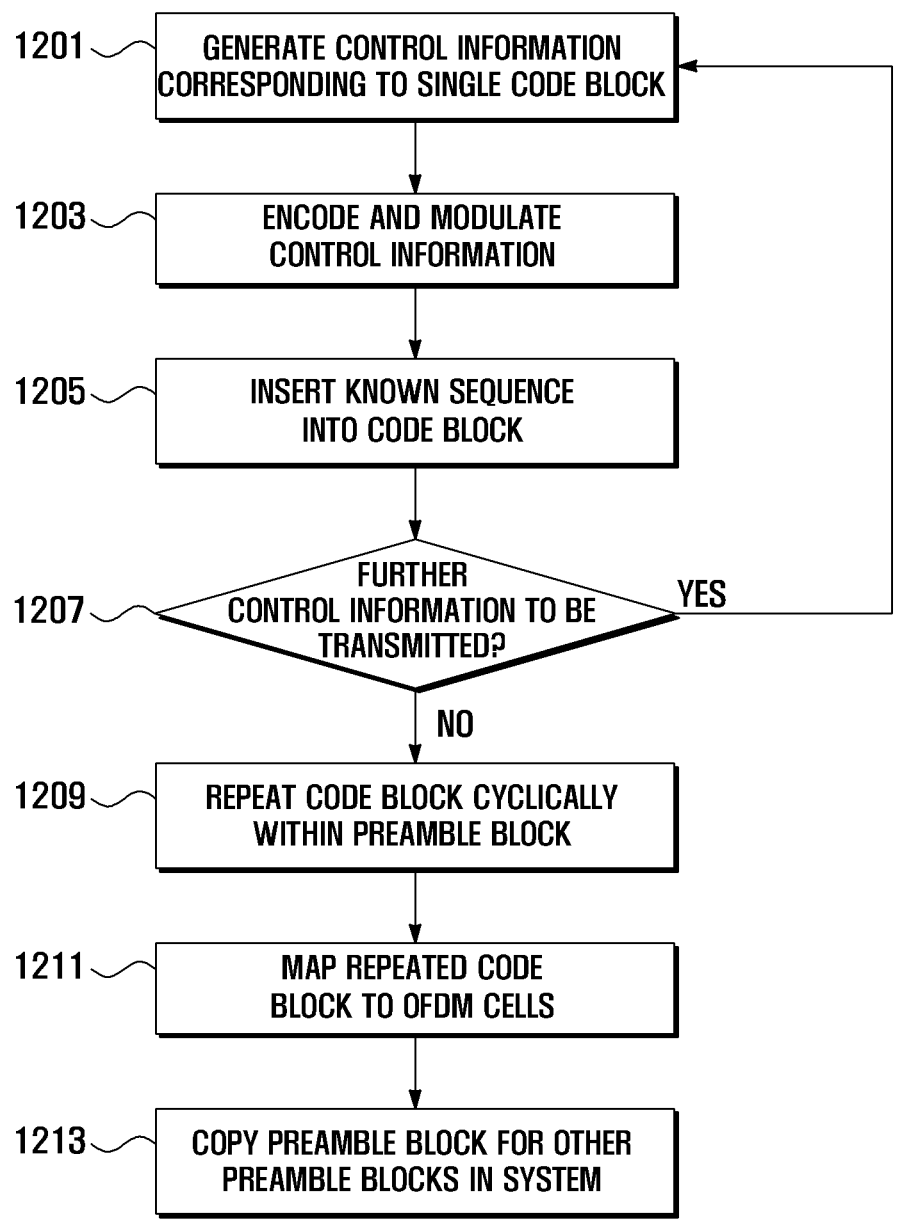
FIG. 12 is a flowchart illustrating a method for generating a preamble having a known sequence is inserted in front of a FEC block as described with reference to FIG. 7.

FIG. 12 is a flowchart illustrating a method for generating a preamble having a known sequence is inserted in front of a FEC block as described with reference to FIG. 7.

Referring to FIG. 12, the transmitter first generates control information corresponding to an FEC block in step 1201. Next, the transmitter encodes and modulates the control information into a FEC block in step 1203 and inserts a known sequence in front of the FEC block to output a complete FEC block in step 1205. Once an FEC block is generated, the transmitter determines whether there is further control information to be transmitted in step 1207. If there is further control information to be transmitted, the procedure goes to step 1201. Otherwise, if there is no further control information to be transmitted, the transmitter repeats the FEC block cyclically until a preamble block is filled in step 1209. Next, the transmitter maps the FEC blocks to OFDM cells to generate the preamble block in step 1211. Finally, the transmitter copies the preamble block to be applied within the entire system in step 1213.

Figure 13:
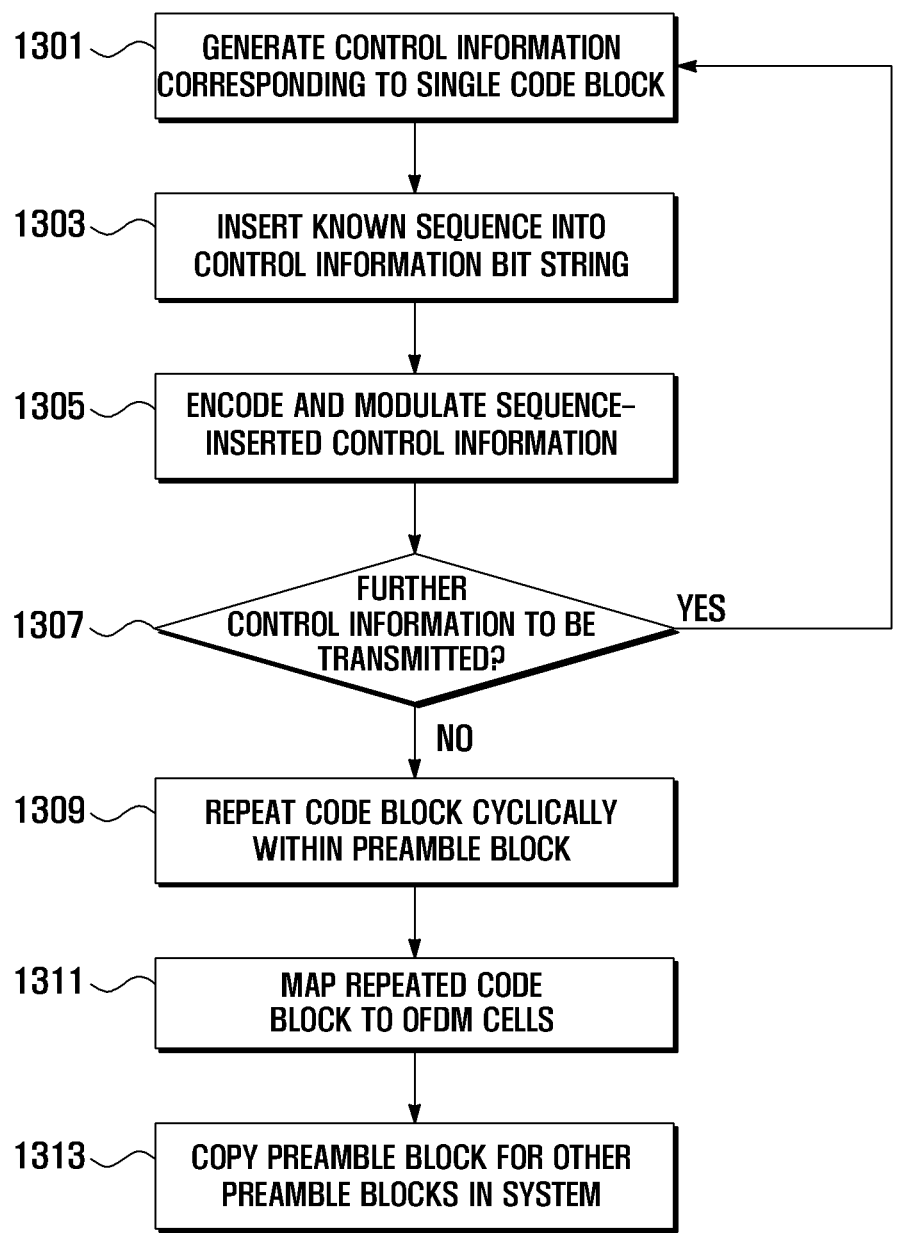
FIG. 13 is a flowchart illustrating a method for generating a preamble block having a known sequence inserted in the middle of a FEC block as described with reference to FIG. 8.

FIG. 13 is a flowchart illustrating a method for generating a preamble block having a known sequence inserted in the middle of a FEC block as described with reference to FIG. 8.

The preamble block generation procedure depicted in FIG. 13 is similar to that of FIG. 12 except that the encoding step 1203 and the sequence insertion step 1205 are switched with each other in FIG. 13.

Referring to FIG. 13, the transmitter generates control information corresponding to an FEC block in step 1301. Next, the transmitter inserts a known sequence into the control information bit string in step 1303 and then encodes and modulates the known sequence-inserted control information bit string to output an FEC block in step 1305. Once an FEC block is generated, the transmitter determines whether there is further control information to be transmitted in step 1307. If there is further control information to be transmitted, the procedure goes to step 1301. Otherwise, if there is no further control information to be transmitted, the transmitter repeats the FEC block cyclically until a preamble block is filled in step 1309. Next, the transmitter maps the FEC blocks to OFDM cells to generate the preamble block in step 1311. Finally, the transmitter copies the preamble block to be applied within the entire system in step 1313.

Figure 14:
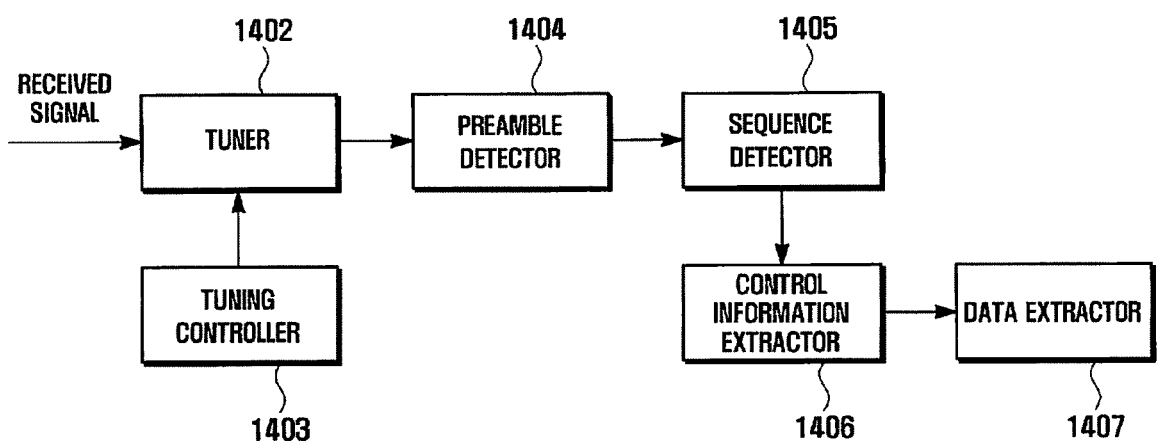
FIG. 14 is a block diagram illustrating a configuration of a receiver according to an embodiment of the present invention.

The preamble generation methods according to the embodiments of the present invention are described hereinabove. Operations of a receiver for receiving the preamble generated as described above are described hereinafter. FIG. 14 is a block diagram illustrating a configuration of a receiver according to an embodiment of the present invention.

Referring to FIG. 14, the receiver according to an embodiment of the present invention includes a tuner 1402, a tuning controller 1403, a preamble detector 1404, a sequence detector 1405, a control information extractor 1406, and a data extractor 1407.

The tuning controller 1403 determines a tuning window (reception bandwidth) over a system bandwidth. That is, the tuning controller 1403 controls such that the tuning window is positioned to receive target broadcast data transmitted over a specific broadcast bandwidth. For instance, the tuning window can be aligned as denoted by reference numeral 730 in FIG. 7 or reference numeral 830 in FIG. 8.

The tuner 1402 is tuned to receive the broadcast data through the tuning window under the control of the tuning controller 1403. The preamble detector 1404 detects the preamble from the broadcast signal received through the tuning window. The sequence detector 1405 searches the preamble for the sequence of a first FEC block and calculates the length and position of the control information based on the found sequence. Calculating the length and position of the control information has been described with reference to FIGS. 7 and 8.

The control information extractor 1406 extracts the control information based on the length and position of the control information. As aforementioned, the FEC block is repeated within a preamble block such that a partial FEC block placed at the last part of the preamble block can be combined with the previous FEC block to acquire the complete control information. The data extractor 1407 decodes the data received on the channel base on the parameters contained in the extracted control information.

Figure 15:
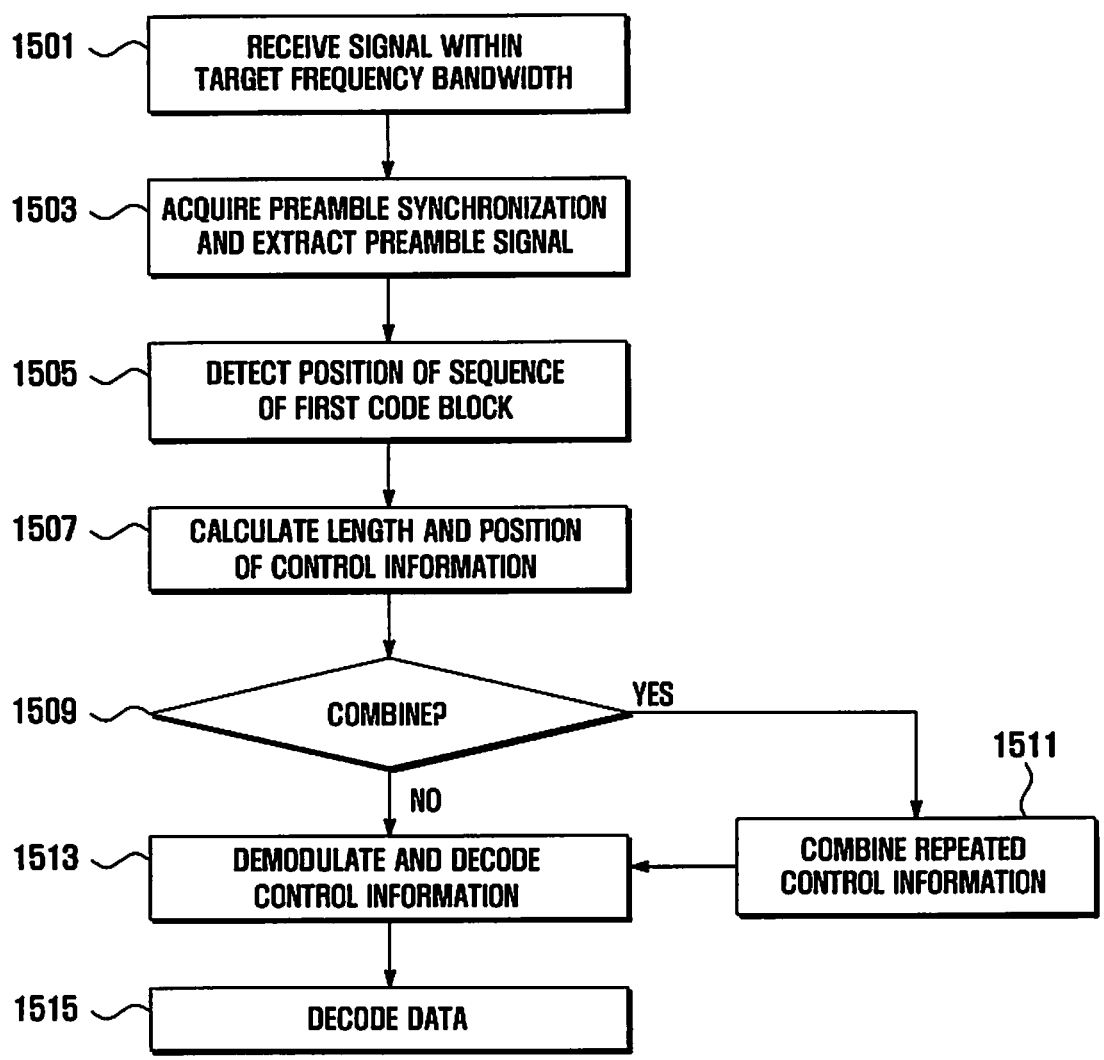
FIG. 15 is a flowchart illustrating a method for receiving a preamble having a known sequence according to an embodiment of the present invention.

The structure of a receiver for receiving the preamble has been described hereinabove. A method for receiving the preamble according to an embodiment of the present invention is described hereinafter. FIG. 15 is a flowchart illustrating a method for receiving a preamble having a known sequence according to an embodiment of the present invention.

Referring to FIG. 15, the receiver receives a broadcast signal through a predetermined tuning window (i.e. reception bandwidth) in step 1501. While receiving the broadcast signal, the receiver acquires frame synchronization on the time axis and detects a preamble in the time direction in step 1503. Next, the receiver detects a position of a sequence of the first FEC block within the preamble in the frequency direction in step 1505 and then calculates the length and position of the control information base on the position of the sequence in step 1507.

In an embodiment of the present invention, the FEC block is repeated cyclically to fill the preamble block such that the partial F EC blocks can be combined to the complete control information. Once the length and position of the control information are calculated, the receiver determines whether to combine the FEC blocks received within the preamble block in step 1509. It is determined to combine the FEC blocks, the receiver combines the repeated FEC blocks in step 1511.

Referring to the exemplary case of FIG. 7, the header 703 followed by the FEC block 704 are identical with the header 705 followed the corresponding part of the FEC block 706 such that the header 703 followed by the FEC block 704 can be combined with the header 705 followed by the FEC 706 by synchronizing their start points.

Referring to the exemplary case of FIG. 8, since the parts of blocks 809 and 804 and block 805 received within the tuning window 803 correspond to parts of the blocks 806 and 807 and block 808, the parts of the blocks 809 and 804 and the block 805 can be combined with the FEC block including the blocks 806, 807, and 808.

After combining the FEC blocks, the receiver demodulates and extracts the control information base on the length and position of the control information in step 1513. Finally, the receiver decodes the data base on the parameters contained in the control information in step 1515. If it is determined not to combine the FEC blocks, step 1511 is skipped.

As described above, the preamble transmission and reception method and apparatus for an OFDM system operate with an improved preamble designed to simplify the structure of a receiver and use combining diversity, resulting in improvement of the reception performance.

Also, the preamble transmission and reception method and apparatus for an OFDM system is robust to the frequency offset error by using an improved preamble having a known sequence, resulting in improvement of reception reliability.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A preamble generation method comprising:
    coding and modulating control information into one or more Forward Error Correction (FEC) blocks;
    adding a header in front of each of the one or more FEC blocks;
    repeating cyclically a part of the one or more header-inserted FEC blocks to fill a preamble block, the preamble block including the one or more header-inserted FEC blocks and the part; and
    mapping the repeated part of the one or more header-inserted FEC blocks to one or more Orthogonal Frequency Division Multiplexing (OFDM) cells to generate the preamble block.

2. The preamble generation method of claim 1, wherein the header is generated based on a known sequence.

3. The preamble generation method of claim 2, wherein the known sequence is a pseudo noise sequence.

4. The preamble generation method of claim 1, wherein the FEC blocks have equal length.

5. The preamble generation method of claim 1, wherein the header includes length information corresponding to the one or more header-inserted FEC blocks included in the preamble block.

6. An apparatus comprising:
    an encoder for coding and modulating control information into one or more Forward Error Correction (FEC) blocks;
    a sequence generator for adding a header in front of each of the one or more FEC blocks;
    a repeater for repeating cyclically a part of the one or more header-inserted FEC blocks to fill a preamble block, the preamble block including the one or more header-inserted FEC blocks and the part; and
    a symbol mapper for mapping the repeated part of the one or more header-inserted FEC blocks to one or more Orthogonal Frequency Division Multiplexing (OFDM) cells to generate the preamble block.

7. The apparatus of claim 6, further comprising a sequence generator for generating the header and a sequence for the header.

8. The apparatus of claim 7, wherein the sequence is a pseudo noise sequence.

9. The apparatus of claim 6, wherein the FEC blocks have equal length.

10. The apparatus of claim 6, wherein the header includes length information corresponding to the one or more header-inserted FEC blocks included in the preamble block.

11. A method for generating a preamble block from one or more Forward Error Correction (FEC) blocks, comprising:
    (a) encoding and modulating control information to generate an FEC block;
    (b) inserting a header in front of the FEC block;
    (c) if further control information is to be transmitted, returning to step (a); and
    (d) if no further control information is to be transmitted, generating a preamble block by:
        (i) generating an FEC frame comprising each header and corresponding FEC block generated by steps (a)-(b) in sequence;
        (ii) for a remaining portion of the preamble block not filled by the FEC frame, repeating the sequence of one or more headers and corresponding FEC blocks in the FEC frame until the preamble block is filled; and
        (iii) mapping the FEC blocks to one or more Orthogonal Frequency Division Multiplexing (OFDM) cells to generate the preamble block.

12. An apparatus for generating a preamble block from one or more Forward Error Correction (FEC) blocks, comprising:
    an encoder which generates an FEC block by encoding and modulating control information;
    a sequence generator which generates a sequence for a header to be inserted in front of each FEC block generated by the encoder, wherein the encoder and sequence generator generate one or more FEC blocks and corresponding headers as long as there is control information to be transmitted, thereby generating an FEC frame comprising a sequence of one or more headers, each followed by its corresponding FEC block;
    a repeater which, when no further control information is to be transmitted, fills whatever portion of the preamble block is not filled by the generated FEC frame by repeating the sequence of one or more headers and corresponding FEC blocks; and a symbol mapper for mapping the FEC blocks to one or more Orthogonal Frequency Division Multiplexing (OFDM) cells to generate the preamble block.

* * * * *